United States Patent [19]

Oder

[11] 4,281,799

[45] Aug. 4, 1981

[54] PROCESS FOR IMPROVED MAGNETIC BENEFICIATION OF CLAYS

[75] Inventor: Robin R. Oder, San Francisco, Calif.

[73] Assignee: J. M. Huber Corporation, Locust, N.J.

[21] Appl. No.: 27,641

[22] Filed: Apr. 6, 1979

Related U.S. Application Data

[63] Continuation of Ser. No. 727,277, Sep. 27, 1976, abandoned, which is a continuation of Ser. No. 580,396, May 23, 1975, abandoned, which is a continuation of Ser. No. 405,487, Aug. 8, 1974, abandoned.

[51] Int. Cl.³ .................... B02C 23/18; B03B 1/04
[52] U.S. Cl. .......................... 241/24; 209/3; 209/39; 209/214; 106/288 B
[58] Field of Search ........... 209/5, 39, 40, 213, 209/214, 3; 241/20, 24, 16; 210/222, 223; 106/72, 188 B

[56]  References Cited

U.S. PATENT DOCUMENTS

| 2,500,154 | 3/1910 | Crockett | 209/40 X |
|---|---|---|---|
| 2,907,666 | 10/1919 | Millman | 106/72 |
| 2,915,412 | 12/1919 | Lyons | 106/72 X |
| 3,171,718 | 3/1965 | Gunn | 106/72 X |
| 3,307,790 | 3/1967 | Cohn | 209/3 X |
| 3,464,634 | 9/1969 | Bruciner | 209/5 X |
| 3,471,011 | 10/1969 | Tannscelli | 209/214 |
| 3,536,264 | 10/1970 | Helton | 209/5 X |
| 3,645,454 | 2/1972 | Fowler | 209/39 X |
| 3,667,689 | 6/1972 | Whitley | 209/214 X |
| 3,765,921 | 10/1973 | Puskar | 106/288 B |
| 3,980,240 | 9/1976 | Nott | 241/20 |

FOREIGN PATENT DOCUMENTS

| 877731 | 5/1953 | Fed. Rep. of Germany | 209/213 |
|---|---|---|---|
| 141880 | 8/1922 | United Kingdom | 209/5 |
| 903846 | 8/1962 | United Kingdom | 209/39 |

Primary Examiner—Robert Halper
Attorney, Agent, or Firm—W. F. Hyer; Harold H. Flanders

[57]  ABSTRACT

An improved method for separating minute, weakly magnetically susceptible particles from an aqueous clay-water slurry containing said particles in minor concentration with substantially non-magnetic minute mineral particles. In accordance with the improvement, the effects of subjecting said particles to separation in a magnetic field, are augmented by subjecting the slurry to a preliminary treatment which mechanically works the dispersed phase of the slurry as to effect release of the contaminant particles. Such working may, for example, be provided by subjecting the slurry, preferably at high solids content, to mechanical shear, to high velocity impact, or to kneading.

1 Claim, 1 Drawing Figure

EFFECT OF SHEAR UPON TiO$_2$ REDUCTION BY MAGNETIC SEPARATION

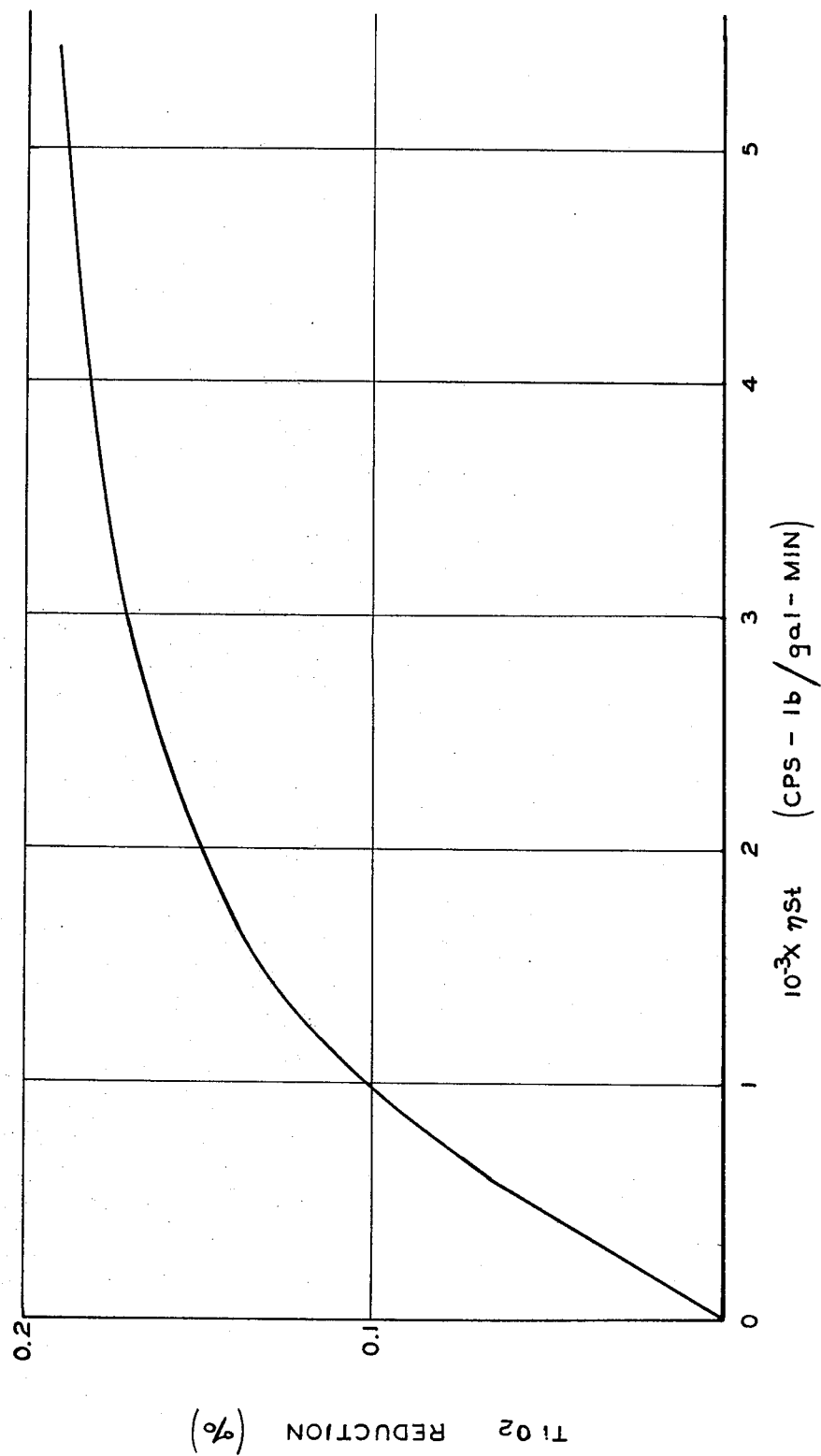

PROCESS FOR IMPROVED MAGNETIC BENEFICIATION OF CLAYS

This is a continuation of application Ser. No. 727,277 filed Sept. 27, 1976, now abandoned which is a continuation of 580,396, filed May 23, 1975 now abandoned, which is continuation of 405,487, filed Aug. 8, 1974, now abandoned.

BACKGROUND OF INVENTION

This invention relates generally to processes for improving the brightness of clays, such as the kaolin clays utilized in the manufacture of paper, and more specifically relates to a process for improving the magnetic benefication of said clays.

Naturally occurring kaolin clay deposits are known to contain discoloring contaminants. Commonly, for example, iron and titanium minerals, as well as other minerals such as montmorillonite and mica, may in various combinations be responsible for such discoloration. The titanium minerals, for example, are commonly present as $TiO_2$ (e.g. in the form of anatase), and such minerals vary from yellow to dark brown in color. Similarly, in the case of montmorillonite, such mineral is known to be magnetic and to have the ability to capture staining surface iron because of its high cation exchange capacity. These various cited impurities are largely responsible for the yellow-brown shade of many kaolins. Indeed the clay is often rejected as being unsuitable for commercial use, solely on the basis of color, even though its other physical properties, such as the viscosity of clay-water slurries and particle size distribution are within desired limits.

The brightness of clay usually is increased during processing by fractionation: the finer the particles size, the brighter the clay. However, this increase is usually insufficient for the more discolored clays to be rendered acceptable commercially, and additional treatment is required of the fine clay, such as chemical leaching. Leaching with chemicals such as zinc or sodium hydrosulphite thus generally results in improving brightness of the refined clay slurries, although an increase of only 2 to 5 brightness points is usually obtained. There are other known methods of improving brightness of clays, but generally these techniques are quite expensive and do not give sufficient increase in brightness to justify the cost.

In the past, numerous attempts have been made to remove contaminants by the use of magnetic techniques, where the said contaminants are responsive to magnetic attraction. Such techniques utilize the force of a magnetic field gradient to cause differential movement of mineral grains through the said field. In U.S. Pat. No. 3,471,011, for example, magnetic beneficiation of kaolin clay is taught utilizing techniques wherein a slurry of clay in water is subjected to a high intensity magnetic field of at least 8,500 gauss, with the time of retention in the field being from 30 seconds to 8 minutes—in order to separate particles of low magnetic susceptibility from the slurry. More recently in the present assignee's copending application Ser. No. 309,839, filed by Joseph Iannicelli on Nov. 27, 1972, now abandoned as a continuation of Ser. No. 19,169, filed Mar. 13, 1970, now abandoned apparatus and methodology are taught wherein a clay-water slurry is passed through a canister packed with steel wool or similar highly irregular and porous ferromagnetic material. In the presence of an intense magnetic field, the combination set forth has been found to be highly effective in moving the magnetically attractable contaminants, by virtue of the ability of the said system to concentrate the field at myriad points in the canister volume at which attraction may occur.

While magnetic separation techniques such as those set forth above, have therefore been found to be of great value in removing certain contaminants from the clay slurries, and indeed result in several points increase of brightness in the treated products, it is nevertheless found in practice that various of the contaminants are removed only with the greatest difficulty. Among other things, it may be noted that the factor of retention time in the magnetic field has been found to be of great importance in removing certain of these relatively intractable contaminants, with removal being greatly augmented as retention times increase. Unfortunately, however, this factor of retention time is one which must be traded off against the economics of a processing situation. This is to say, that the use of long retention period (and sometimes multiple-pass processing) results in inefficient employment of the large scale and expensive magnetic separating machinery as the slurry passes through the said separator—with consequent losses elsewhere on the production line. Accordingly, it is of considerable interest to discover those techniques which may improve the magnetic separation methodology, both with respect to removal of contaminants previously deemed incapable of treatment; and as well to expediting removal of these contaminants which while known to be magnetically removable have in the past required inacceptable retention periods in the magnetic field to accomplish same.

In accordance with the foregoing, it may be regarded as an object of the present invention, to provide an improved process for magnetically removing discoloring contaminants from clay-water slurries, which process enables highly efficient removal of said contaminants.

It is a further object of the present invention to provide an improved process for magnetically removing discoloring contaminants from clay-water slurries, which enables removal of said contaminants with increased rapidity, and elimination of multiple-pass processing, whereby to render practical high rate and large scale treatment of the said slurries.

It is another object of the present invention, to provide an improved process for magnetically removing discoloring contaminants from clay-water slurries, wherein the efficiency of the process is so improved that it is not required to utilize magnetically saturated matrices.

It is a further object of the present invention, to provide a process for facilitating removal of discoloring contaminants, which process does not require introduction of foreign chemical agents.

SUMMARY OF INVENTION

Now in accordance with the present invention, it has unexpectedly been found that magnetic separation of insoluble discolorants, such as iron-stained anatase, from clay-water slurries containing such contaminants, is greatly facilitated by initially subjecting said slurries to a mechanically induced releasing step, which acts to place the contaminants in condition where the contaminating particulate matter is released from the clay surface to which it is normally bound, whereby such contaminants are enabled to respond in more effective fashion to the incident magnetic field. In accordance with one aspect of the invention, release and/or selective dispersion of the said contaminants from the clay particles can be thus effected by mechanically working the slurry in advance of magnetic separation, as for example by subjecting the slurry to high mechanical shear, by impacting the slurry at high velocity against a surface to shatter particulate matter, or by kneading the slurry, or so forth. In order to provide maximum working of the slurry, such preliminary treatment is preferably conducted with high solids content in the slurry (>30%), although the techniques are also effective with lower solids content slurries.

BRIEF DESCRIPTION OF DRAWINGS

In the drawing appended hereto:

The FIGURE is a graphical depiction, showing the effects of shear upon reduction of titanium dioxide for a representative clay thereupon subjected to magnetic separation.

DESCRIPTION OF PREFERRED EMBODIMENTS

The magnetic apparatus techniques utilized herein, including the apparatus which may be used for such purposes, do not per se comprise the present invention; and accordingly such techniques and apparatus are not disclosed in detail herein. Reference may be had in this connection to the common assignee's copending application Ser. No. 309,839, referred to above, for an example of typical apparatus which may be utilized for the present purposes. Apparatus which may be similarly employed, are also shown elsewhere, as for example, in U.S. Pat. No. 3,627,678. In the aforementioned Serial No. 309,839 apparatus, a magnetic field is maintained in the steel-wool matrix between pole members, at a mean intensity of at least 7,000 gauss and preferably at considerably higher strengths (from 10,000 to 20,000 gauss) throughout the matrix in which separation is effected. Comparable magnetic intensities may be utilized in accordance with the present techniques; however, considerably lower fields and/or comparatively reduced retention periods in the fields may be beneficially employed by virtue of the facility lent to magnetic separation by the presently disclosed processes—as will be apparent in the ensuing examples.

EXAMPLE 1

In order to illustrate the effect of the techniques of the invention upon the brightness of clays subjected to magnetic beneficiation, a sample of unleached slurry of the middle Georgia type, No. 1 fraction—i.e. with particle distribution size such that 92% by weight of the particles have an equivalent spherical diameter (E.S.D.) less than 2 microns—was obtained from normal plant production. The said sample was initially subjected to a magnetic separation treatment in apparatus of the type discussed above, for a total retention time of 6 minutes at an average field of 17 koe (kilooersteds). No more titanium-based and iron-based discolorants could be removed by further treatment under such circumstances. The sample prior to such treatment had a brightness of 84.3 on the TAPPI scale (all brightness data in this specification refer to measurements made according to the standard TAPPI procedure T646m-54). Following such initial magnetic treatment a test sample displayed a brightness of 89.5.

The remainder of the slurry was then flocculated with 31/ton alum, filtered, and the filter cakes reduced to 40.4% solids by addition of water. Two samples were then utilized in further testing. The first of said samples, a control sample, was dispersed to a pH of 6.65 with TSPP, and the solids cut to 25.0%. This control sample was then magnetically separated at 6 minutes retention time and 17 koe. Its brightness was found to have increased to 89.7.

The second of said two samples was sheared for 15 minutes at 40.4% solids, by means of a model L 459 zirconium Kady mill. The Kady mill is a well-known product of the Kinetic Dispersion Corporation, Buffalo, New York. Mills of this type function to break up agglomerate masses, by subjecting same to both shearing and impact shattering. The slurry was dispersed with TSPP and solids cut to 25.8%. The sample was then subjected to magnetic separation at 6 minutes retention time in a 17 koe field, and upon testing was found to have a brightness of 91.3.

EXAMPLE II

A sample of unleached slurry of the same middle Georgia type as considered in Example I (No. 1 fraction), was determined initially to have a brightness of 84.6, a titanium dioxide content of 1.6%, and $Fe_2O_3$ content of 0.36%. As a control, a first part of the sample was magntically separated, with an 8 minute retention time in a 17 koe field, and yielded a brightness of 89.4. Titanium dioxide in this control sample was reduced to 0.86%; and $Fe_2O_3$ to 0.30%.

A second portion of the slurry sample was flocculated with 31/ton of alum, filtered, and reblunged at 39.4% solids. This portion was then sheared using a zirconium Kady mill (as above), employing a cooling jacket, for 15 minutes. 31/ton of TSPP was added at the beginning of shearing and 31/ton after 10 minutes, for purposes of dispersing the clay. The said second portion was then subjected to magnetic separation with 8 minutes retention time in a 17 koe field. The brightness thereupon increased to 90.8; $TiO_2$ content was reduced to 0.421; and $Fe_2O_3$ content to 0.27%.

EXAMPLE III

The sample of Example II was subjected to magnetic separation at 8 minutes retention time and 17 koe field, to yield a brightness of 89.4 (as previously described), and thereupon was subjected to a second, identical magnetic separation. The brightness increased to 90.4; the $TiO_2$ content was reduced to 0.59%; and the $Fe_2O_3$ content to 0.28%. The brightness achieved in this double separation in some 0.4 points less than that achieved in single pass separation following shearing, as described in Example II. It therefore will be clear that mechanical working can substantially increase the capacity of magnetic processing by reducing the necessity for multiple magnetic separation in those cases where very high brightnesses are of interest.

It can be shown that the work input provided to the slurry during shearing or other mechanical working is proportional to the expression (S η T), when S is the volume of slurry treated per unit time, η is the slurry viscosity, and t is the time of mechanical treatment. The data in Table I hereinbelow, is derived from a series of No. 1 Middle Georgia clay samples, which were treated with the Kady mill mentioned in Example II, at solids contents as noted. After shearing, the samples were dispersed with TSPP and subjected to magnetic separation for retention times of 8 minutes at a low intensity field of about 2.4 kG. The Table I sets forth the factors S, $\eta$ and t for the several samples, plus the factors S $\eta$ t$\times 10^{-3}$). The percentage $TiO_2$ is also given, and the changes in $TiO_2$ content from an initial level (for all samples) of 0.99%.

TABLE I

| % solids | S (lb/gal) | η (cps) | t (min) | % TiO₂ | Δ (% TiO₂) | (S η t × 10⁻³) |
|---|---|---|---|---|---|---|
| — | — | — | 0 | .99 | 0. | — |
| 30 | 3.1 | 9 | 12 | .95 | 0.04 | .335 |
| 30 | 3.1 | 9 | 27 | .89 | 0.10 | .755 |
| 30 | 3.1 | 9 | 57 | .87 | 0.12 | 1.590 |
| 57 | 7.4 | 17 | 12 | .85 | 0.14 | 1.510 |
| 57 | 7.4 | 17 | 27 | .83 | 0.16 | 2.40 |
| 57 | 7.4 | 17 | 60 | .80 | 0.19 | 5.33 |

In the graphical depiction of the appended FIGURE, the data of Table I is shown in terms of percentage reduction of $TiO_2$, as a function of the factor S $\eta$ t$\times 10^{-3}$.

The releasing action brought about by mechanical working can be achieved with a variety of means. For example, high shearing can be accomplished by use of an instrument such as the well-known Cowles dissolver—available from Cowles Dissolver Corp., Cayuga, New York. Similarly, kneading can be utilized, particularly where solids content is high. For such purposes, kneading devices such as are customarily used for viscosity control in the working of crude clays, may be employed.

The mechanical working step of the invention can be conducted at any point in the processing of the clay prior to magnetic separation. Thus, for example, the said working, as by shearing, impact shattering or so forth, may be conducted either before or after a leaching step, if such is employed. Similarly, such mechanical working can be accomplished on a whole clay, a whole degritted clay, or any fraction of that clay.

It is important to point out that some clays which are not readily susceptible to brightness improvements by the methods of the invention, yet are found to be markedly responsive to increased production rate. This is to say that by employing the invention the production flow rates necessary to achieve a given brightness level, may in many cases be increased (i.e. retention time in the magnetic separator decreased), even though the absolute brightness level is but slightly raised. It has been shown in the copending patent application of R. Oder, now U.S. Pat. No. 4,005,008, that brightness in the type of separation apparatus utilized with the present processes, saturates with increased efficiency of magnetic separation (increased field strength, retention time, packing density of the separation matrix, etc.). Hence if one is working with a well tuned separator, then any improvements in clay preparation which will allow for easier discolorant removal, will have a greater effect upon additional increase in production rate than upon brightness improvement. A number of clays have thus been observed which show marginal or modest brightness improvements where the present pre-magnetic separation treatments are used, but virtually all clays investigated show pronounced reduction in retention time for a specified brightness level. This, of course, implies increased production rate, as the latter is inversely related to retention time.

While the present invention has been set forth in terms of specific embodiments thereof, it will be understood in view of the instant disclosure that numerous variations upon the invention are enabled to those skilled in the art, which variations yet reside within the scope of the instant teaching. Accordingly, the invention is to be broadly construed, and limited only by the scope and spirit of the claims appended hereto.

We claim:

1. The method for removing discolorants from a crude clay by a process including a step of separating weakly magnetically susceptible minute contaminant particles including titanium dioxide from an aqueous clay-water slurry containing said particles in minor concentration with substantially non-magnetic minute mineral particles by subjecting said slurry to magnetic separation in a magnetic field; the improvement comprising reducing the titanium dioxide content of the said clay by:
  (a) mechanically working said clay-water slurry by application of means to produce a force selected from the group consisting of shear forces, impact forces, kneading forces and combinations of two or more of said forces, at a viscosity n in centipoises (cps), a solids content s in pounds per gallon (lg./gal.), and for a time t in minutes (min.) such that the factor nst has a value in the range of $0.335 \times 10^{-3}$ to $5.33 \times 10^{-3}$ (cps.-lb./gal.-min.) to release the contaminant particles including said titanium dioxide to be removed from said slurry;
  (b) dispersing said clay-water slurry to disperse said contaminant particles to facilitate said magnetic separation; and
  (c) thereafter, magnetically separating said clay-water slurry in a manner to reduce the titanium dioxide content of said clay.

* * * * *

UNITED STATES PATENT AND TRADEMARK OFFICE
CERTIFICATE OF CORRECTION

PATENT NO. : 4,281,799
DATED : August 4, 1981
INVENTOR(S) : Robin R. Oder

It is certified that error appears in the above—identified patent and that said Letters Patent is hereby corrected as shown below:

Column 3, line 25, "magnetic apparatus" should be -- magnetic separation --.

Column 4, line 2, "31/ton" should be -- 3 lb./ton --.

Column 4, line 28, "magntically" should be -- magnetically --.

Column 4, lines 33, 36, and 37, "31/ton" should be -- 3 lb./ton --.

Column 4, line 42, "0.421" should be -- 0.42% --.

Column 6, line 41, "(lg./gal.) should be -- (lb./gal.) --.

Signed and Sealed this

Seventh Day of September 1982

[SEAL]

Attest:

GERALD J. MOSSINGHOFF

Attesting Officer     Commissioner of Patents and Trademarks